United States Patent

Tokai

[11] Patent Number: 5,619,348
[45] Date of Patent: Apr. 8, 1997

[54] COLOR MASKING PARAMETER DETERMINING APPARATUS

[75] Inventor: Kiwame Tokai, Ebina, Japan

[73] Assignee: Fuji Xerox Co., Ltd., Tokyo, Japan

[21] Appl. No.: 544,552

[22] Filed: Oct. 18, 1995

[30] Foreign Application Priority Data

Oct. 19, 1994 [JP] Japan .................................. 6-253249

[51] Int. Cl.$^6$ ...................................................... H04N 1/60
[52] U.S. Cl. ......................................... 358/518; 358/523
[58] Field of Search ................................... 358/518, 523, 358/520, 517, 521; 348/661

[56] References Cited

FOREIGN PATENT DOCUMENTS

| 61-50153 | 3/1986 | Japan . | |
|---|---|---|---|
| 61-281768 | 12/1986 | Japan | H04N 1/46 |
| 5-236268 | 9/1993 | Japan | H04N 1/46 |

*Primary Examiner*—Scott A. Rogers
*Attorney, Agent, or Firm*—Oliff & Berridge

[57] ABSTRACT

A color masking parameter determining apparatus comprising a virtual spectral reflectance generating means for generating virtual spectral reflectance according to spectral reflectance of actually printed color patch, a sensor output calculating means for performing calculation on virtual spectral reflectance and spectral response of the constituent elements of a sensor thereby obtaining primary color luminance as the ideal output of the sensor, a coordinate-in-uniform-color-space calculating means for calculating coordinates in the uniform color space corresponding to the virtual spectral reflectance, and a masking parameter calculating means for transforming coordinates in the uniform color space in conformity with actual phenomena to primary color luminance values by calculating arbitrary coordinates in the uniform color space using the calculated primary color luminance values and coordinates in the uniform color space thereby obtaining color masking parameters.

2 Claims, 6 Drawing Sheets

COLOR MASKING PARAMETER DETERMINING APPARATUS

BACKGROUND OF THE INVENTION

The present invention relates to a color masking parameter determining apparatus and more particularly to an apparatus, in a color sensor (color scanner), for determining color masking parameters to be used in transforming red (R), green (G), and blue (B) luminance signals obtained by the sensor to coordinates in the uniform color space.

In the fields of color printing, color television, and color copying machines, numbers of techniques on color signal transformation have so far been proposed. As an example, there is a technique by which an input color space (for example, the BGR system) is transformed to an output color space (for example, the CIE-L*, a*, b* system). When coordinates (L*, a*, b*) in the uniform color space are to be obtained from primary-color luminance signals (R, G, B) of an original obtained from a color-separation color scanner, the primary-color luminance signals (R, G, B) are first transformed to primary-color density signals (Dr, Dg, Db) using equation (1) and then the results obtained are transformed to the coordinates (L*, a*, b*) in the uniform color space using equation (2).

$$\begin{pmatrix} Dr \\ Dg \\ Db \end{pmatrix} = \begin{pmatrix} -\log R \\ -\log G \\ -\log B \end{pmatrix} \quad (1)$$

$$\begin{pmatrix} L^* \\ a^* \\ b^* \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Dr \\ Dg \\ Db \end{pmatrix} \quad (2)$$

In equation (2), ($a_{ij}$) are called color masking parameters.

In order to perform the above transform as accurately as possible, it is practiced to obtain the color masking parameters ($a_{ij}$) by carrying out the method of least squares for the coordinates in the uniform color space. In concrete terms, N color patches (N: natural number) having known $L^*_k$, $a^*_k$, $b^*_k$ (k=1, ..., N) are measured by a color sensor and color masking parameters $a_{11}, a_{12}, a_{13}$ minimizing equation (3) the value obtained by in lightness, for example, are sought:

$$e^2 = \sum_{k=1}^{N} (L_k^* - a_{11}D_{rk} - a_{12}D_{gk} - a_{13}D_{bk})^2 \quad (3)$$

This can be done by solving the simultaneous equations (4):

$$\begin{pmatrix} \sum_{k=1}^{N} D_{rk}^2 & \sum_{k=1}^{N} D_{rk}D_{gk} & \sum_{k=1}^{N} D_{rk}D_{bk} \\ \sum_{k=1}^{N} D_{rk}D_{gk} & \sum_{k=1}^{N} D_{gk}^2 & \sum_{k=1}^{N} D_{gk}D_{bk} \\ \sum_{k=1}^{N} D_{rk}D_{bk} & \sum_{k=1}^{N} D_{gk}D_{bk} & \sum_{k=1}^{N} D_{bk}^2 \end{pmatrix} \begin{pmatrix} a_{11} \\ a_{12} \\ a_{13} \end{pmatrix} = \begin{pmatrix} \sum_{k=1}^{N} L_k^* D_{rk} \\ \sum_{k=1}^{N} L_k^* D_{gk} \\ \sum_{k=1}^{N} L_k D_{bk} \end{pmatrix} \quad (4)$$

In the apparatus for determining such color masking parameters, it is difficult to obtain the color patches to be used in obtaining the color masking parameters by sufficient number or at suitable intervals in the uniform color space. Therefore, methods not using actual color patches, but using values of simulative color patches obtained by simulation, have so far been known. For example, there is a method, disclosed in Japanese Patent Laid-open No. Sho 61-50153, by which virtual color patches are selected at regular intervals and primary-color principal densities of cyan (C), magenta (M), and yellow (Y) are transformed to primary-color luminance values (R, G, B) with Neugebauer equation used, and then color masking parameters are determined according to the values obtained.

In the above described techniques so far in use, a method to presume an ideal model is adopted in the simulation, but since the model does not conform well to actual phenomena, there has been a problem that the accuracy of the determined color masking parameters is not good. Accordingly, the present invention has as its object the provision of a color masking parameter determining apparatus, which needs production of only a small number of color patches and is capable of determining easily and economically the most suitable color masking parameters in conformity with actual phenomena.

SUMMARY OF THE INVENTION

A color masking parameter determining apparatus according to the present invention comprises a virtual spectral reflectance generating means for generating virtual spectral reflectance according to the spectral reflectance of actually printed color patches, a sensor output calculating means for performing calculation on the virtual spectral reflectance and the spectral response of the constituent elements of a color sensor to thereby obtain primary color luminance as the ideal output of the color sensor, a coordinate-in-uniform-color-space calculating means for calculating the coordinates in the uniform color space corresponding to the virtual spectral reflectance, and a masking parameter calculating means for calculating, according to the calculated primary color luminance and the coordinates in the uniform color space, prediction luminance value of the output of the color sensor corresponding to coordinates sampled at regular intervals in the uniform color space and obtaining color masking parameters from the sampled coordinates and the prediction output luminance values.

In the color masking parameter determining apparatus structured as described above, virtual spectral reflectance values on the basis of the spectral reflectance of a small number of actually printed color patches are obtained in the virtual spectral reflectance generating means and a large number of virtual color patches are produced by setting those having the virtual spectral reflectance as virtual color patches. While, the ideal output value (primary color luminance value) of the color sensor with respect to the color patch is obtained by calculation on the virtual spectral reflectance and the spectral response of the constituent elements of the color sensor, without the need for making actual color patches, in the sensor output calculating means, coordinate values in the uniform color space corresponding to the virtual spectral reflectance are calculated in the coordinate-in-uniform-color-space calculating means. Further, in the masking parameter calculating means, arbitrary coordinates in the uniform color space are calculated using the primary color luminance and the coordinate values in the uniform color space and, thereby, transform from the coordinates in the uniform color space to the primary color luminance values is performed corresponding to actual phenomena and the color masking parameters are determined on the basis of the primary color luminance values.

DESCRIPTION OF THE PREFERRED EMBODIMENTS

Figure 1:
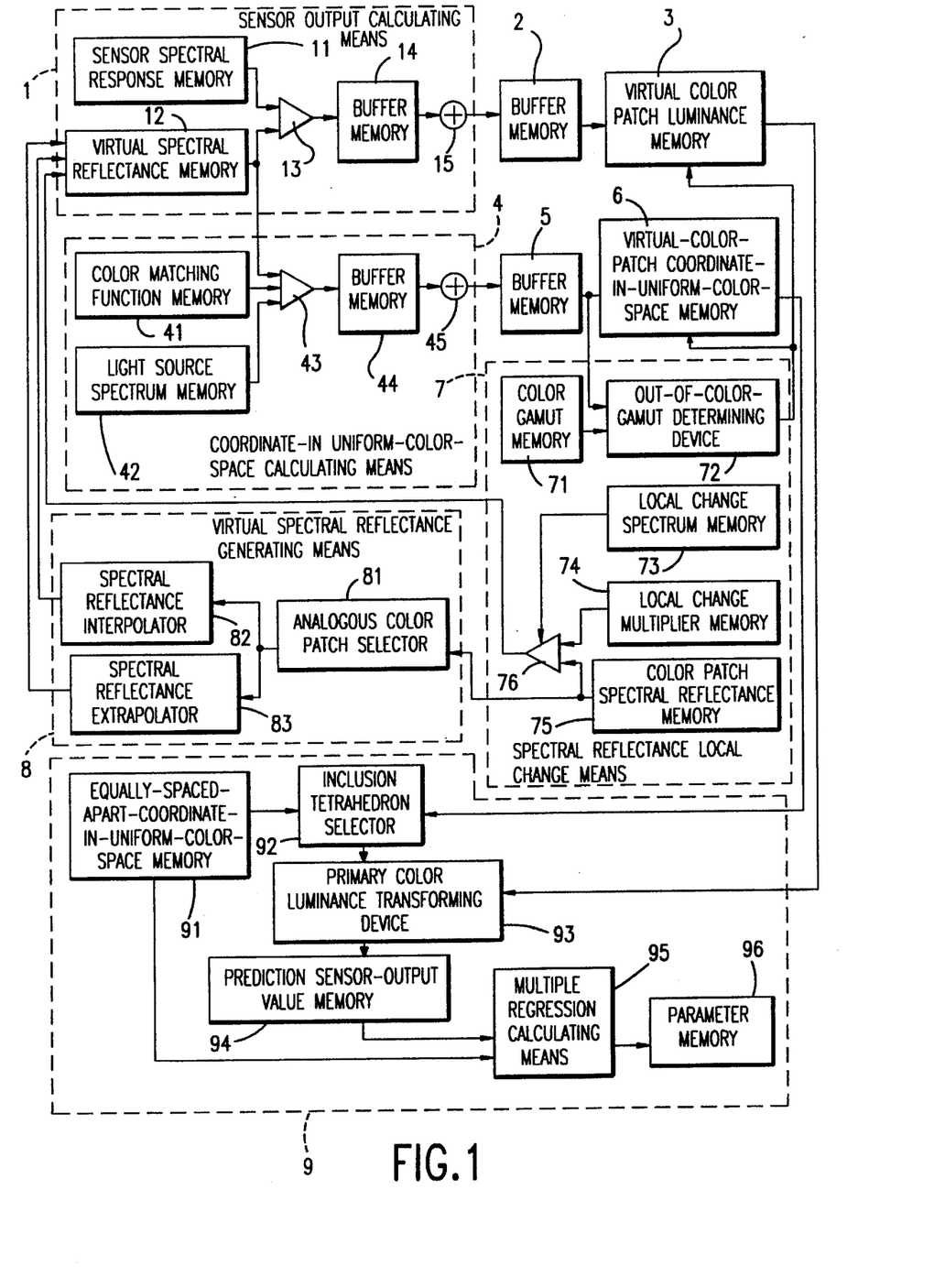
FIG. 1 is a block diagram showing an embodiment of a color masking parameter determining apparatus according to the present invention.

FIG. 1 is a block diagram showing an embodiment of the invention. Referring to FIG. 1, a sensor output calculating means 1 is made up of a sensor spectral response memory 11 storing spectral sensitivity of a color sensor (not shown), a virtual spectral reflectance memory 12 storing virtual spectral reflectance of color patches, a multiplier 13 multiplying values stored in each of the memories 11 and 12 together, a buffer memory 14 temporarily storing the products output from the multiplier 13, and an adder 15 adding values stored in the buffer memory 14 together. The sensor output calculating means calculates ideal output of the color sensor from the spectral reflectance and so on. A buffer memory 2 temporarily stores the sensor output value calculated in the sensor output calculating means 1. A virtual color patch luminance memory 3 retains the value stored in the buffer memory 2 under the condition described below.

A coordinate-in-uniform-color-space calculating means 4 is made up of a color matching function memory 41 storing the spectrum of the color matching function, a light source spectrum memory 42 storing spectral distribution of a light source attached to the color sensor, a multiplier 43 multiplying values stored in the virtual spectral reflectance memory 12, the color matching function memory 41, and the light source spectrum memory 42 together, a buffer memory 44 temporarily storing the products output from the multiplier 43, and an adder 45 for adding values stored in the buffer memory 44 together. The coordinate-in-uniform-color-space calculating means 4 calculates coordinates of virtual color patches in the uniform color space from the spectral reflectance, the color matching function, and the spectrum of the light source. A buffer memory 5 temporarily stores the coordinates calculated in the coordinate-in-uniform-color-space calculating means 4. A virtual-color-patch coordinate-in-uniform-color-space memory 6 retains the values stored in the buffer memory 5 under the condition described below.

A spectral reflectance local change means 7 includes a color gamut memory 71 storing the color gamut, or the gamut of reproducible colors, of actually printed color patches and an out-of-color-gamut determining device 72 for determining whether the coordinates of the virtual color patch in the uniform color space stored in the buffer memory 5 are located outside the color gamut of the actually printed color patch stored in the color gamut memory 71. The out-of-color-gamut determining device 72, when it determines that the coordinates of the virtual color patch in the uniform color space are located outside the color gamut of the color patch, supplies the result of determination to both the virtual color patch luminance memory 3 and the virtual-color-patch coordinate-in-uniform-color-space memory 6. Namely, the fact that the coordinates of the virtual color patch in the uniform color space are located outside the color gamut of the color patch becomes the condition under which the virtual color patch luminance memory 3 and the virtual-color-patch coordinate-in-uniform-color-space memory 6 retain the values stored in the buffer memories 2 and 5.

The spectral reflectance local change means 7 further includes a local change spectrum memory 73 storing the wavelength range to be changed for increasing the saturation, a local change multiplier memory 74 storing the multiplier for the spectral reflectance, a color patch spectral reflectance memory 75 storing the spectral reflectance of the actually printed color patch, and a multiplier 76 multiplying the values stored in each of the local change multiplier memory 74 and the color patch spectral reflectance memory 75 together with reference to the spectrum specified by the local change spectrum memory 73. The spectral reflectance local change means 7 makes local change of the spectrum when virtual spectral reflectance is produced.

A virtual spectral reflectance generating means 8 is made up of an analogous color patch selector 81 selecting a spectrally analogous color patch from spectral reflectance values of actually printed color patches stored in the color patch spectral reflectance memory 75, a spectral reflectance interpolator 82 and a spectral reflectance extrapolator 83 performing interpolation and extrapolation, described later, on the basis of the spectrum selected by the analogous color patch selector 81. The virtual spectral reflectance generating means 8 produces the virtual spectral reflectance through the interpolation and extrapolation performed on the basis of the spectrum of the actually printed color patch.

A masking parameter calculating means 9 is made up of an equally-spaced-apart-coordinate-in-uniform-color-space memory 91 storing coordinates obtained by sampling at regular intervals in the uniform color space, an inclusion tetrahedron selector 92 selecting four coordinates in the uniform color space of the virtual color patch stored in the virtual-color-patch coordinate-in-uniform-color-space memory 6 that define a tetrahedron including coordinates stored in the equally-spaced-apart-coordinate-in-uniform-color-space memory 91, a primary color luminance transforming device 93 calculating a prediction luminance value of the output of the color sensor by using the values of the four points selected by the inclusion tetrahedron selector 92, a prediction sensor-output value memory 94 storing the prediction sensor-output luminance calculated by the primary color luminance transforming device 93, a multiple regression calculating means 95 making regression calculation with the use of coordinates stored in the equally-spaced-apart-coordinate-in-uniform-color-space memory 91 and prediction luminance values stored in the prediction sensor-output value memory 94 thereby obtaining masking parameters, and a parameter memory 96 storing the masking parameters calculated by the multiple regression calculating means 95. In the described manner, prediction sensor-output luminance values corresponding to the coordinates obtained by sampling at regular intervals in the uniform color space are calculated according to the luminance and the coordinates in the uniform color space of the virtual color patch stored in the virtual color patch luminance memory 3 and the virtual-color-patch coordinate-in-uniform-color-space memory 6, respectively, and, thereupon, color masking parameters are produced from the two values.

Operations performed by each block of the above described structure will now be described. First, in the sensor output calculating means 1, ideal output of the color sensor is simulated by performing calculations on spectral reflectance of virtual color patch and spectral responses of the constituent elements of the sensor shown in equation (5):

$$Orel = \sum^{\lambda} C(\lambda) \cdot S(\lambda) \cdot R(\lambda) \tag{5}$$

where $$C(\lambda) = \prod^{i} Ci(\lambda) \tag{6}$$

Orel denotes the relative value of the sensor output, i denotes the constituent elements of the sensor, $\lambda$ denotes wavelength, $Ci(\lambda)$ denotes the spectrum of the constituent elements of the sensor, $S(\lambda)$ denotes the spectral sensitivity of a single sensor element, and $R(\lambda)$ denotes the spectral reflectance of the color patch.

In concrete terms, the color sensor spectral sensitivity $C(\lambda) \cdot S(\lambda)$ stored in the sensor spectral response memory 11 and the virtual spectral reflectance $R(\lambda)$ of the color patches stored in the virtual spectral reflectance memory 12 are multiplied together in the multiplier 13 and the products are added together in the adder 15 through the buffer memory 14. By such calculations, ideal output values of the color sensor with respect to the color patch can be obtained without making actual color patches.

Then, coordinates in the uniform color space are calculated from the spectral reflectance values of color patches by the coordinate-in-uniform-color-space calculating means 4. First, transform to the CIE-XYZ system is performed according to equation (7):

$$\begin{pmatrix} X \\ Y \\ Z \end{pmatrix} = \begin{pmatrix} \sum^{\lambda} Fx(\lambda) \cdot D(\lambda) \cdot R(\lambda) \\ \sum^{\lambda} Fy(\lambda) \cdot D(\lambda) \cdot R(\lambda) \\ \sum^{\lambda} Fz(\lambda) \cdot D(\lambda) \cdot R(\lambda) \end{pmatrix} \tag{7}$$

where $F(\lambda)$ denotes the color matching function and $D(\lambda)$ denotes the spectrum of the light source. In concrete terms, the virtual spectral reflectance $R(\lambda)$ stored in the virtual spectral reflectance memory 12, the color matching function $F(\lambda)$ stored in the color matching function memory 41, and the spectrum $D(\lambda)$ of the light source stored in the light source spectrum memory 42 are multiplied together in the multiplier 43 and each of the products are added together in the adder 45 through the buffer memory 44.

The thus obtained coordinates (X, Y, Z) can be transformed to the coordinates (L*, a*, b*) in the uniform color space according to equation (8):

$$\begin{pmatrix} L^* \\ a^* \\ b^* \end{pmatrix} = \begin{pmatrix} 116 \, (Y/Wy)^{1/3} - 16.0 \\ 500\{(X/Wx)^{1/3} - (Y/Wy)^{1/3}\} \\ 200\{(Y/Wy)^{1/3} - (Z/Wz)^{1/3}\} \end{pmatrix} \tag{8}$$

where Wx, Wy, Wz denote values of X, Y, Z on the basis of the standard white.

When coordinates of an arbitrary point in the uniform color space are to be converted into primary color luminance values, the calculation is performed in the masking parameter calculating means 9 by making supplementation using the primary color luminance values stored in the virtual color patch luminance memory 3 and the coordinates in the uniform color space stored in the virtual-color-patch coordinate-in-uniform-color-space memory 6. The supplement is made as described below. First, the uniform color space is divided into tetrahedrons having the coordinates of the virtual color patch as its apexes in the inclusion tetrahedron selector 92 and, then, decision is made as to which tetrahedron includes the coordinates of the arbitrary point in the uniform color space that is sought.

Figure 2:
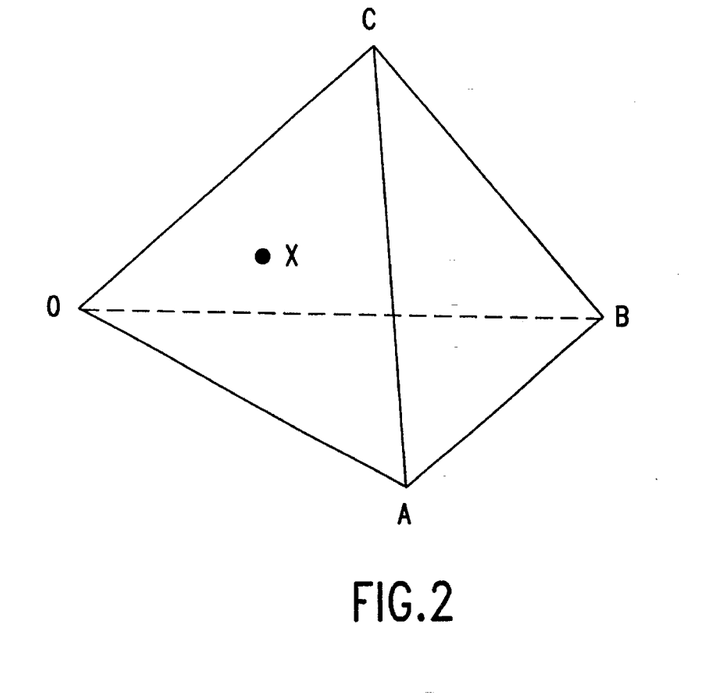
FIG. 2 is a conceptual diagram of supplementation made when arbitrary coordinates in the uniform color space are to be transformed to primary color luminance values.

Then, transform is carried out by the primary color luminance transforming device 93 using primary color luminance values corresponding to the apexes A, B, C, O of the tetrahedron. The procedure of the transform is as follows. First, an arbitrary vector in the three-dimensional space can be expressed as in equation (9):

$$OX = sOA + tOB + uOC \tag{9}$$

where O, A, B, C, X denote the points in the tetrahedron shown in FIG. 2. Then, the primary color luminance values at the point X can be obtained using equation (10):

$$\{Bx, Gx, Rx\} = s\{Ba, Ga, Ra\} + t\{Bb, Gb, Rb\} + u\{Bc, Gc, Rc\} + (1-s-t-u)\{So, Go, Ro\} \tag{10}$$

where the subscripts attached to B, G, R denote the positions of the point. Namely, BX, for example, denotes the value of blue (B) at the point X.

Figure 3:
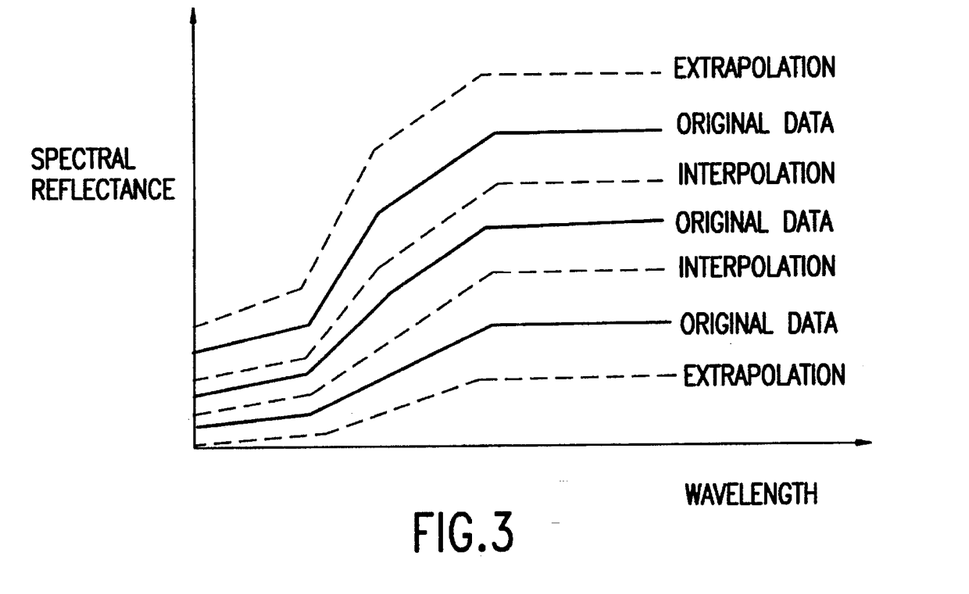
FIG. 3 is a diagram showing interpolation and extrapolation performed in producing virtual color patches.
Figure 4:
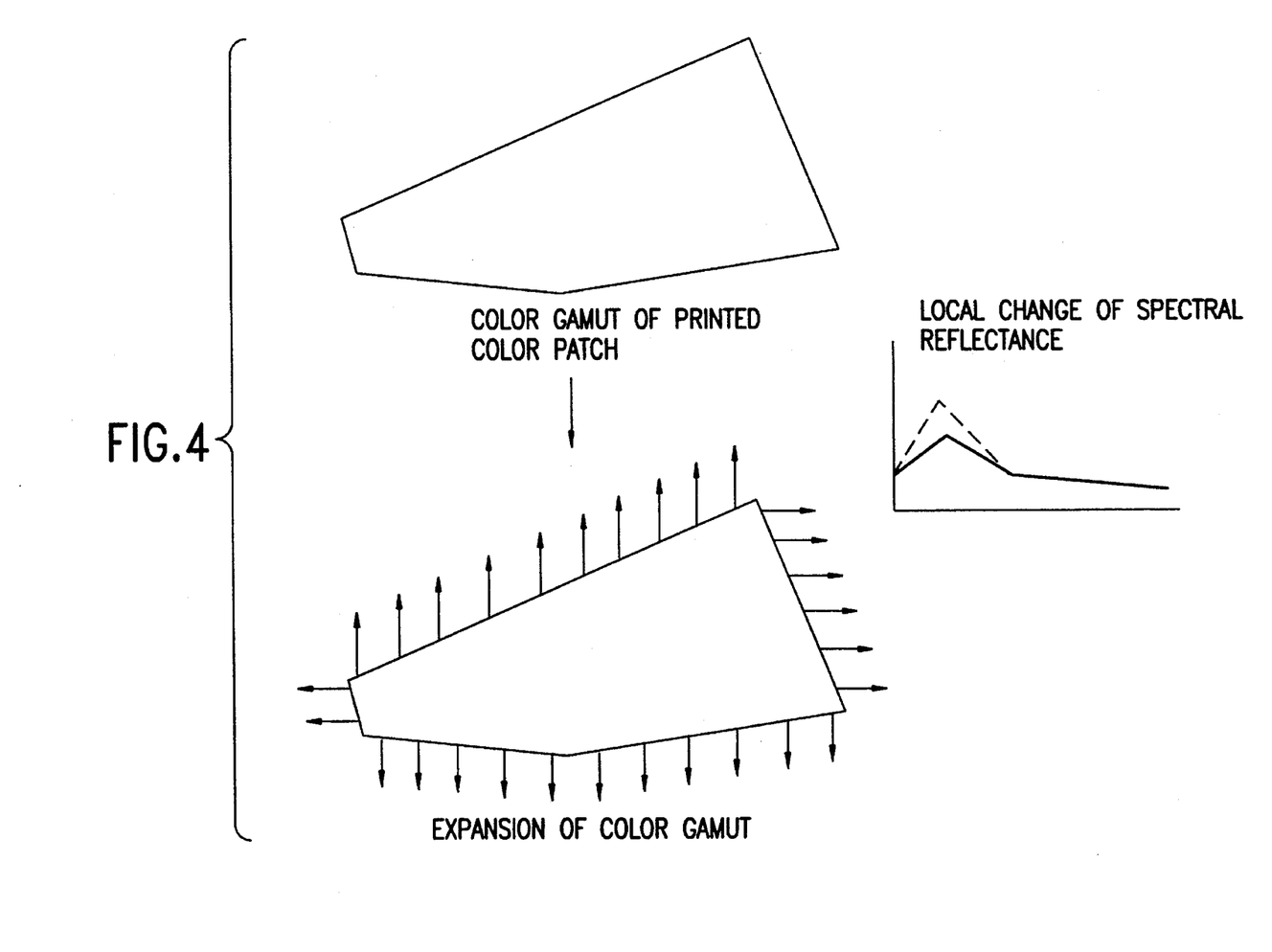
FIG. 4 is a conceptual diagram of expansion of the gamut of reproducible colors made in locally changing the spectral reflectance.

Production of a virtual color patch will be now described. In the production of the virtual color patch, the virtual spectral reflectance is obtained on the basis of the spectral reflectance of an actual color patch by applying interpolation, extrapolation, and local change to the same and, then, the one having the virtual spectral reflectance is set as the virtual color patch. In concrete terms, in the virtual spectral reflectance generating means 8, the color patch whose spectrum is quite analogous to that of the virtual color patch to be newly produced is selected by the analogous color patch selector 81 from the spectral reflectance of the actually printed color patch stored in the color patch spectral reflectance memory 75. Then, on the basis of the thus selected spectrum, the interpolation and extrapolation are applied thereto in the spectral reflectance interpolator 82 and the spectral reflectance extrapolator 83 in the manner shown in FIG. 3. Since, the production of virtual color patches is based on the spectral reflectance of actual color patches, the produced virtual color patches are in conformity with actual phenomena.

On the other hand, in making local change, the color gamut of an actual color patch is determined and the change is carried out such that a color patch located outside the color gamut is produced. In concrete terms, the change is made in the spectral reflectance local change means 7 by having it determined, by the out-of-color-gamut determining device 72, whether the coordinates of the virtual color patch in the uniform color space stored in the buffer memory 5 are located outside the color gamut of the actually printed color patch stored in the color gamut memory 71 and, when it is determined that they are located outside the reproduction region, storing the coordinates into the virtual-color-patch coordinate-in-uniform-color-space memory 6. Thus, it is achieved to establish the virtual color patch in the direction to expand the color gamut of the actually printed color patch and to thereby obtain such data for the color patch that are difficult to obtain by printing.

Further, to achieve the production of such a color patch that is located outside the color gamut, the spectral reflectance of the color patch forming the contour of the color gamut is locally changed so that any arbitrary one or arbitrary plurality of the coordinates in the uniform color space (L*, a*, b*) become larger. In concrete terms, the spectral reflectance of the actually printed color patch stored in the color patch spectral reflectance memory 75 is multiplied, in the multiplier 76, by the multiplier stored in the local change multiplier memory 74 for the spectrum specified by the local change spectrum memory 73 and the results of the multiplication are supplied to the virtual spectral reflectance memory 12.

The primary color luminance values and the coordinates in the uniform color space produced according to equation (5), equation (7), and equation (8) are those based on the spectral reflectance of actual color patches and therefore data close to actual phenomena can be obtained. Further, any number of the virtual color patches can be obtained by performing the interpolation, extrapolation, and local change many times. Accordingly, the coordinates selected from the uniform color space at suitable intervals can be transformed to primary color luminance values in conformity with actual phenomena according to equation (10) and the masking parameters obtained according to equation (4) become the most suitable ones in conformity with actual phenomena.

Figure 6:
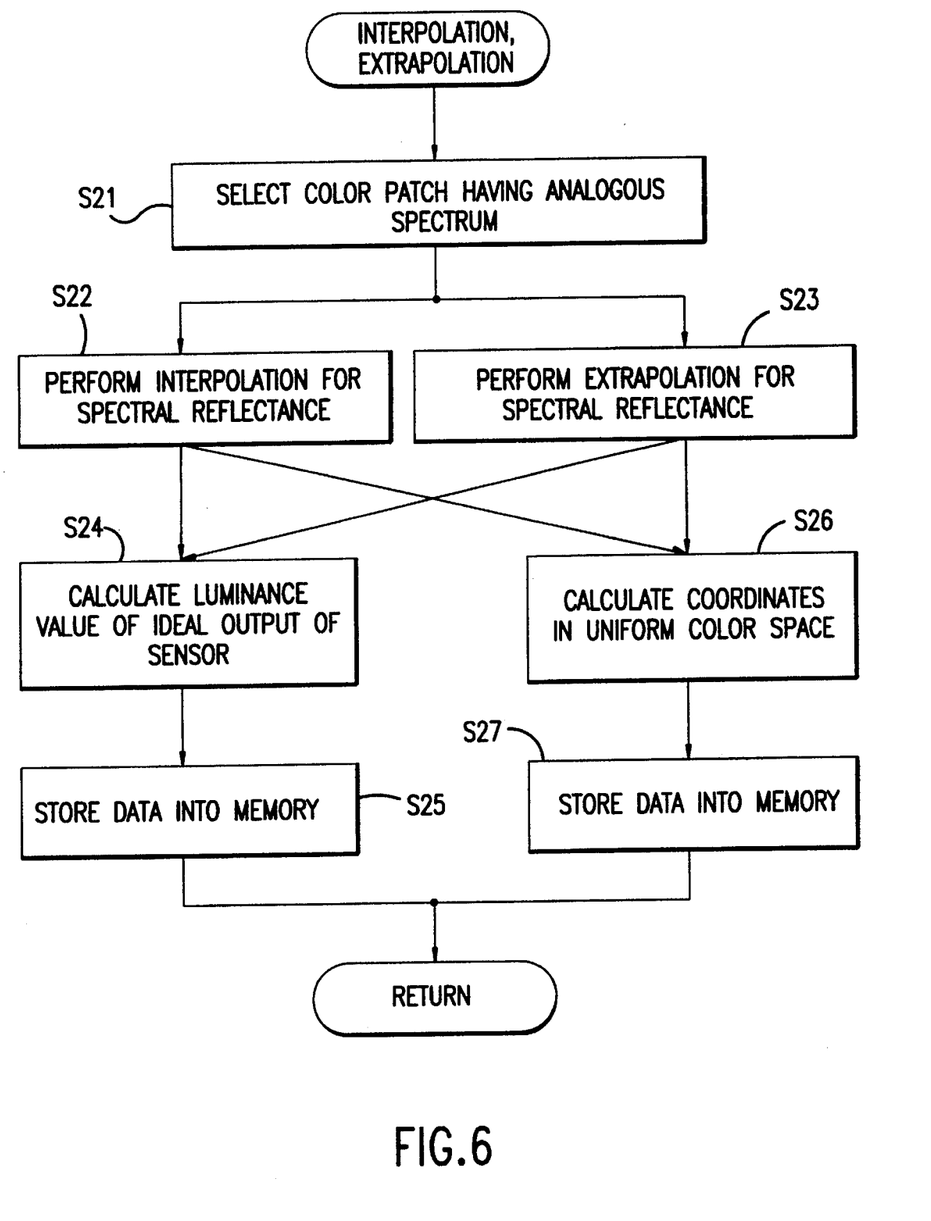
FIG. 6 is a flowchart showing interpolating and extrapolating procedure.
Figure 7:
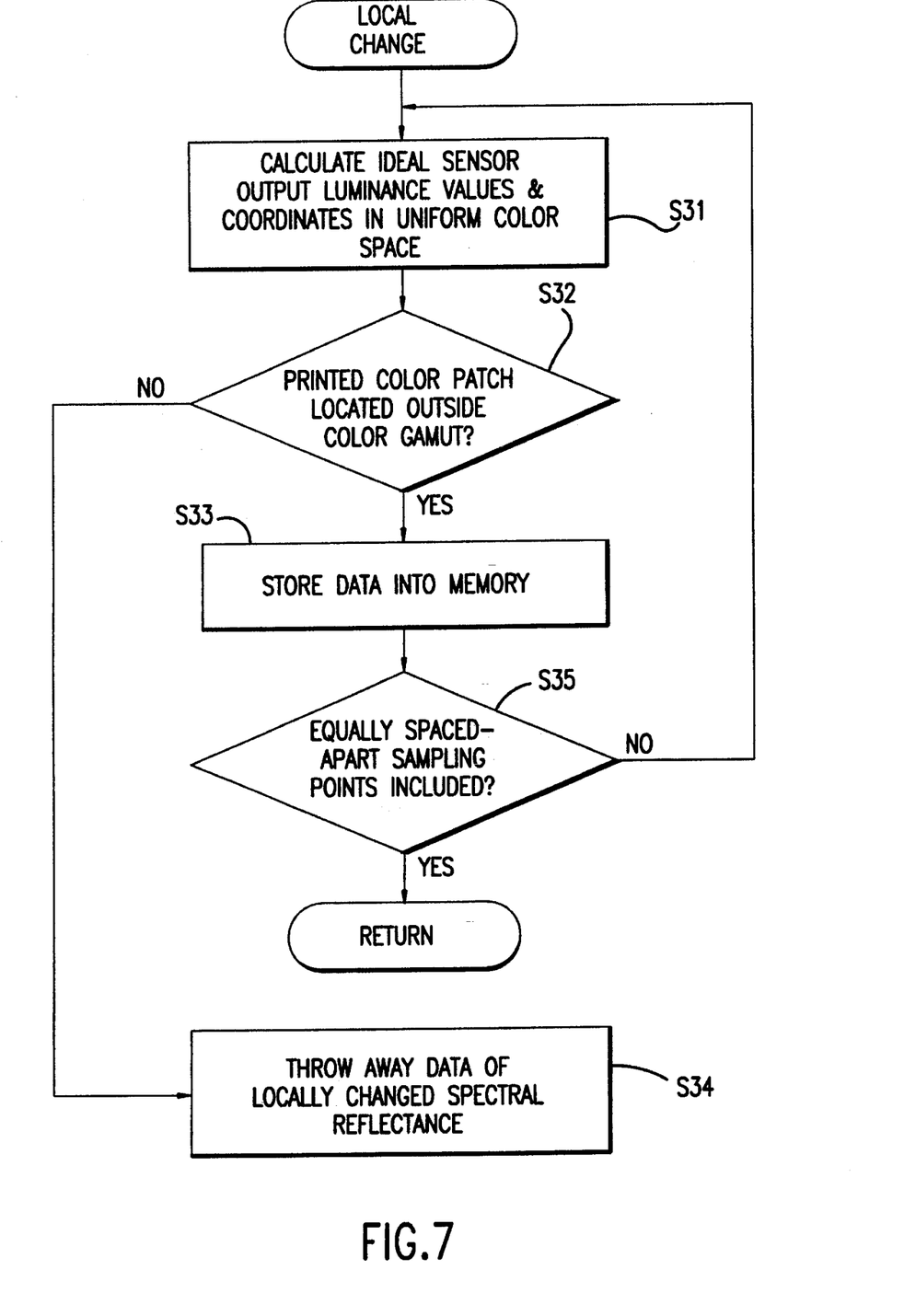
FIG. 7 is a flowchart showing the procedure for locally changing the spectral reflectance.

General operations in the present embodiment will be described with reference to flowcharts of FIG. 5 to FIG. 7.

Figure 5:
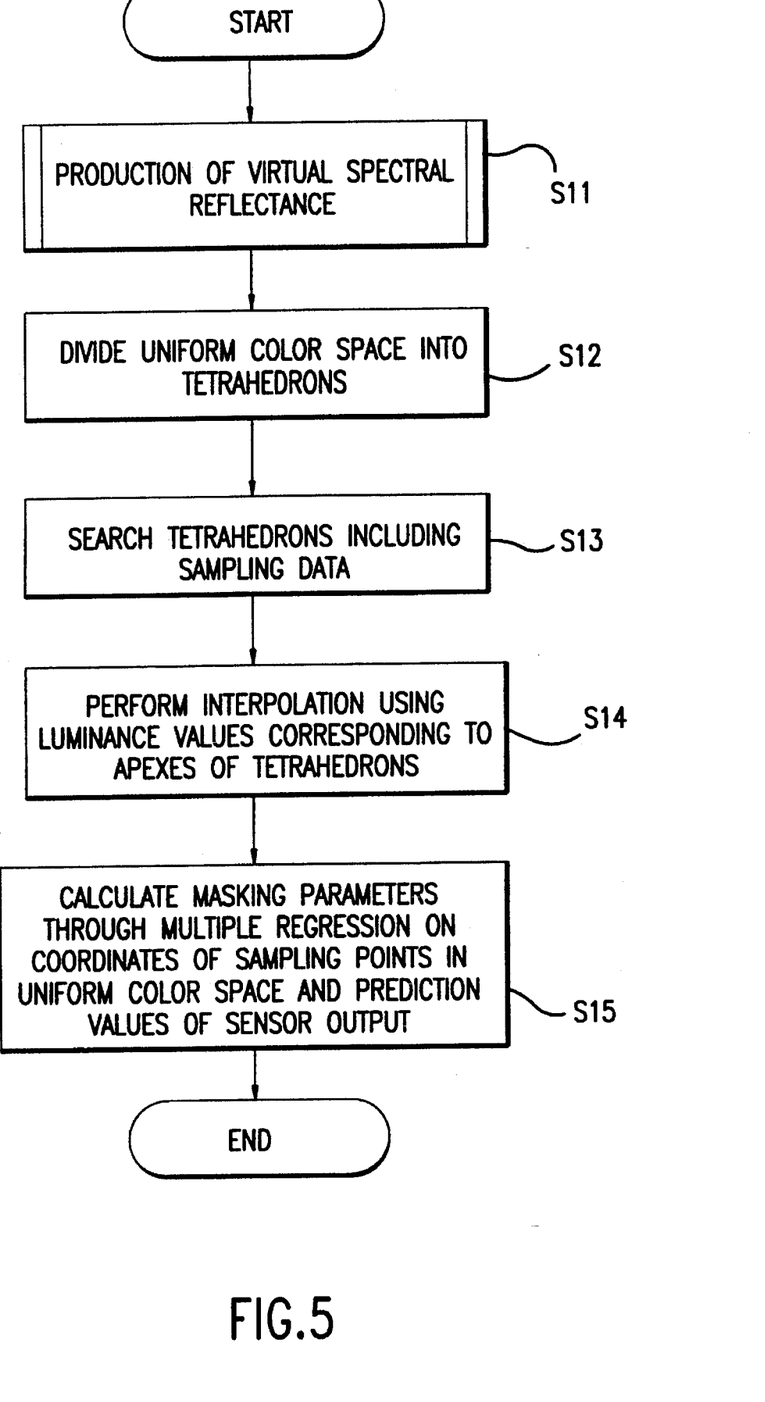
FIG. 5 is a flowchart showing general procedure followed in the embodiment.

In the flowchart of FIG. 5, the virtual spectral reflectance is produced, according to the spectral reflectance of sets of color patches measured by a suitable method using a chrolimeter or the like, in the sensor output calculating means 1 and the coordinate-in-uniform-color-space calculating means 4 (step S11). In the process producing the virtual spectral reflectance, the operation making interpolation and extrapolation after selecting an analogous spectrum and the operation locally changing the spectral reflectance are separately performed, i.e., the operations are performed in parallel.

The procedure for performing the interpolation and extrapolation will be described with reference to the flowchart of FIG. 6. First, the color patch whose spectrum is quite analogous to that of the virtual color patch to be newly produced is selected by the analogous color patch selector 81 from the spectral reflectance of the actually printed color patches stored in the color patch spectral reflectance memory 75 (step S21) and, according to the spectrum of the selected color patch, the calculations for interpolation and extrapolation are performed in the spectral reflectance interpolator 82 and spectral reflectance extrapolator 83 (steps S22, S23). Then, the luminance value of the ideal output of the color sensor is calculated in the sensor output calculating means 1 (step S24) and the luminance value is stored into the virtual color patch luminance memory 3 through the buffer memory 2 (step S25). Meanwhile, the coordinates in the uniform color space are calculated in the coordinate-in-uniform-color-space calculating means 4 (step S26) and the coordinates are stored into the virtual-color-patch coordinate-in-uniform-color-space memory 6 through the buffer memory 5 (step S27).

Now, the procedure for locally changing the spectral reflectance will be described with reference to the flowchart of FIG. 7. First, the luminance value of the ideal output of the color sensor is calculated in the sensor output calculating means 1 according to the virtual spectral reflectance obtained as the product output of the multiplier 76 in the spectral reflectance local change means 7 and the coordinates in the uniform color space are once calculated in the coordinate-in-uniform-color-space calculating means 4 (step S31). Then, the coordinates are compared, in the out-of-color-gamut determining device 72, with the color gamut of the actually printed color patch stored in the color gamut memory 71 (step S32).

When it is determined that the coordinates are located outside the color gamut, the luminance value and the coordinates are stored into the virtual color patch luminance memory 3 and the virtual-color-patch coordinate-in-uniform-color-space memory 6 and, thereby, additions are made to the entire virtual color patch (step S33). Thus, the color gamut of the virtual color patch is made larger and, at the same time, unnatural spectral reflectance is prevented from being introduced. When it is determined that the same is located inside the color gamut, the spectral reflectance data locally changed is thrown away (step S34). Thereafter, it is determined whether the color gamut of the virtual color patch includes the equally spaced-apart sampling points to be used later (step S35) and, when it does not includes them, the processing returns to step S31 and the above described procedure is repeated until the color gamut comes to include all of the equally spaced-apart sampling points and, thus, the operation to giving additions to the virtual color patch is performed.

Referring to FIG. 5 again, after the above described color patches have been produced, the space formed by the virtual color patches is divided into tetrahedrons in the inclusion tetrahedron selector 92 (step S12). There are known several methods to divide the space into tetrahedrons. If Delaunay method is used, the space can be divided to provide improved accuracy in the interpolation performed later. Then, the points sampled at regular intervals in the uniform color space are selected from the space of the virtual color patch divided into the tetrahedrons and the tetrahedrons including such points are searched (step S13).

Then, interpolation using the luminance values corresponding to each of the apexes of the tetrahedron is performed in the primary color luminance transforming device 93 (step S14). Thus, it is made possible to calculate, with good accuracy, the sensor output luminance values corresponding to arbitrary points sampled in the uniform color space. Then, multiple regression on the thus obtained prediction luminance value of the sensor output and the sampling data in the uniform color space stored in the equally-spaced-apart-coordinate-in-uniform-color-space memory 91 is performed in the multiple regression calculating means 95 and masking parameters are thereby calculated (step S15). In this way, color masking parameters in conformity with actual phenomena and allowing highly accurate color transformation can be determined.

According to the invention, as described above, it is arranged such that the virtual spectral reflectance is obtained on the basis of the spectral reflectance of a small number of actually printed color patches, calculation of the corresponding coordinates in the uniform color space and simulation of the primary color luminance values of the sensor output are performed, and, using the thus obtained two values, arbitrary coordinates in the uniform color space are calculated. Then, the transform from coordinates in the uniform color space in conformity with actual phenomena to primary color luminance values is achieved. Further, color masking parameters are obtained on the basis of the primary color luminance values. Thus, it has become possible, while only a small number of color patches are actually produced, to determine, economically and easily, the most suitable color masking parameters in conformity with actual phenomena.

What is claimed is:

1. A color masking parameter determining apparatus comprising:

a virtual spectral reflectance generating means for generating virtual spectral reflectance according to the spectral reflectance of actually printed color patches;

a sensor output calculating means for performing calculation on said virtual spectral reflectance and the spectral response of the constituent elements of a color sensor thereby obtaining primary color luminance as the ideal output of said color sensor;

a coordinate-in-uniform-color-space calculating means for calculating the coordinates in the uniform color space corresponding to said virtual spectral reflectance; and a masking parameter calculating means for calculating, according to said primary color luminance and said coordinates in the uniform color space, prediction luminance value of the output of said color sensor corresponding to coordinates sampled at regular intervals in the uniform color space and obtaining color masking parameters from said sampled coordinates and said prediction output luminance values.

2. A color masking parameter determining apparatus according to claim 1, further comprising a spectral reflectance local change means for locally changing the spectral reflectance of said color patch, determining, according to the changed spectral reflectance, whether the coordinates calculated in said coordinate-in-uniform-color-space calculating means is located outside the color gamut of said color patch, and, when it is determined that the same is located outside the color gamut, supplying the coordinates to said masking parameter calculating means as said uniform color space coordinates.

* * * * *